United States Patent
Nagarajan et al.

(10) Patent No.: US 9,674,075 B1
(45) Date of Patent: Jun. 6, 2017

(54) MULTICAST ONLY FAST RE-ROUTE FOR PIM ASM MODE

(71) Applicant: Juniper Networks, Inc., Sunnyvale, CA (US)

(72) Inventors: Vikram Nagarajan, Chennai (IN); Robert W. Kebler, Newburyport, MA (US); Anish Peter, Bangalore (IN); Abhishek Asthana, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 192 days.

(21) Appl. No.: 14/579,516

(22) Filed: Dec. 22, 2014

(51) Int. Cl.
| | |
|---|---|
| *H04L 12/18* | (2006.01) |
| *H04L 12/28* | (2006.01) |
| *G06F 15/16* | (2006.01) |
| *G06F 15/173* | (2006.01) |
| *H04L 12/707* | (2013.01) |
| *H04L 12/721* | (2013.01) |
| *H04L 12/24* | (2006.01) |
| *H04L 12/761* | (2013.01) |
| *H04L 29/12* | (2006.01) |
| *H04L 12/753* | (2013.01) |

(52) U.S. Cl.
CPC ............ *H04L 45/22* (2013.01); *H04L 12/18* (2013.01); *H04L 12/185* (2013.01); *H04L 41/0654* (2013.01); *H04L 45/12* (2013.01); *H04L 45/16* (2013.01); *H04L 45/48* (2013.01); *H04L 61/2069* (2013.01)

(58) Field of Classification Search
None
See application file for complete search history.

(56) References Cited

U.S. PATENT DOCUMENTS

| | | | |
|---|---|---|---|
| 6,732,182 B1* | 5/2004 | Beverly, IV | ............ H04L 12/18 370/244 |
| 6,894,990 B1* | 5/2005 | Agarwal | ............ H04B 7/18584 370/321 |

(Continued)

OTHER PUBLICATIONS

Adams et al., "Protocol Independent Multicast—Dense Mode (PIM—DM): Protocol Specification (Revised)," Network Working Group, RFC 3973, The Internet Society, Jan. 2005, 57 pp.

(Continued)

*Primary Examiner* — Alpus H Hsu
(74) *Attorney, Agent, or Firm* — Schumaker & Sieffert, P.A.

(57) ABSTRACT

Techniques are described for enhancements to Protocol Independent Multicast (PIM) in an Any Source Multicast (ASM) mode in order to effectively implement Multicast only Fast Re-Route (MoFRR). According to the PIM ASM mode, a router operating as a last hop router connected to a receiver may initiate establishment of both a shared tree and a shortest path tree over which to receive multicast traffic for a given multicast group. According to the disclosed techniques, the router may use the shortest path tree as a primary path on which to receive the multicast traffic, and may use the shared tree as a secondary or backup path for MoFRR in case a failure occurs on the primary path. The techniques enable the router to perform MoFRR for PIM ASM mode without pruning the multicast traffic from the shared tree, and without building additional trees as secondary paths for MoFRR.

17 Claims, 7 Drawing Sheets

(56) References Cited

U.S. PATENT DOCUMENTS

| | | | |
|---|---|---|---|
| 6,917,983 B1* | 7/2005 | Li | H04L 12/18 370/389 |
| 7,453,807 B2* | 11/2008 | Sanchez | H04L 12/1886 370/235 |
| 7,626,984 B2* | 12/2009 | Napierala | H04L 12/1836 370/389 |
| 7,640,333 B1* | 12/2009 | Fernandez Gutierrez | H04L 12/185 709/220 |
| 7,782,799 B2* | 8/2010 | Ko | H04L 12/185 370/256 |
| 7,787,360 B2* | 8/2010 | Windisch | H04L 45/00 370/217 |
| 7,826,348 B2* | 11/2010 | Farinacci | H04L 12/1877 370/228 |
| 7,860,093 B2* | 12/2010 | Shepherd | H04L 12/185 370/390 |
| 7,940,647 B2* | 5/2011 | Zhang | H04L 12/5695 370/217 |
| 7,969,978 B2* | 6/2011 | Napierala | H04L 12/1836 370/389 |
| 8,094,602 B2* | 1/2012 | Gutierrrez | H04L 12/185 370/312 |
| 8,576,844 B1* | 11/2013 | Ghosh | H04L 12/462 370/390 |
| 8,638,659 B2* | 1/2014 | Csaszar | H04L 45/16 370/216 |
| 8,675,653 B2* | 3/2014 | Rokui | H04L 12/185 370/390 |
| 8,761,044 B2* | 6/2014 | Chandrashekharachar Suvarneshwar | H04L 12/185 370/254 |
| 8,913,482 B2* | 12/2014 | Csaszar | H04L 45/16 370/216 |
| 9,019,981 B1* | 4/2015 | Weinstein | H04B 1/719 370/432 |
| 9,077,551 B2* | 7/2015 | Chandrashekharachar Suvarneshwar | H04L 12/185 |
| 9,100,201 B1* | 8/2015 | Pichumani | H04L 12/185 |
| 9,160,553 B2* | 10/2015 | Wu | H04L 12/189 |
| 2006/0182049 A1* | 8/2006 | Rokui | H04L 12/185 370/312 |
| 2012/0099422 A1* | 4/2012 | Liu | H04L 12/185 370/221 |
| 2014/0376366 A1* | 12/2014 | Li | H04L 45/16 370/230 |
| 2015/0288540 A1* | 10/2015 | Kotalwar | H04L 12/4679 370/254 |
| 2015/0358226 A1* | 12/2015 | Liu | H04L 12/18 370/390 |

OTHER PUBLICATIONS

Fenner et al., "Protocol Independent Multicast—Sparse Mode (PIM—SM): Protocol Specification (Revised)," Network Working Group, RFC 4601, The Internet Society, Aug. 2006, 112 pp.

Handley et al., "Bidirectional Protocol Independent Multicast (BIDIR-PIM)," Network Working Group, RFC 5015, Oct. 2007, 43 pp.

Holbrook et al., "Source-Specific Multicast for IP," Network Working Group, RFC 4607, The Internet Society, Aug. 2006, 19 pp.

Karan et al., "Multicast only Fast Re-Route," Network Working Group, draft-ietf-rtgwg-mofrr-04, May 14, 2014, 14 pp.

* cited by examiner

MULTICAST ONLY FAST RE-ROUTE FOR PIM ASM MODE

TECHNICAL FIELD

The invention relates to computer networks and, more particularly, to distribution of multicast traffic over computer networks.

BACKGROUND

A computer network is a collection of interconnected computing devices that exchange data and share resources. In a packet-based network the computing devices communicate data by dividing the data into small blocks called packets. Certain devices within the network, such as routers and switches, maintain routing and/or forwarding information that describe paths through the network. In this way, the packets may be individually transmitted across the network from a source device to a destination device. The destination device extracts the data from the packets and assembles the data into its original form. Dividing the data into packets enables the source device to resend only those individual packets that may be lost during transmission.

Examples of computer networks include enterprise networks, branch networks, service provider networks, home networks, virtual private networks (VPNs), local area network (LANs), virtual LANs (VLANs) and the like. In any case, the computer networks may enable remotely located sources and receivers to share data. In some cases, the computer network may be configured to support multicast traffic, such as Internet Protocol Television (IPTV), desktop conferences, corporate broadcasts, music and video web casts, and other forms of multimedia content. As an example, the computer network may utilize protocol independent multicast (PIM) as a multicast routing protocol to build distribution trees through the computer network for the transmission of multicast traffic from sources to receivers or subscriber devices for particular multicast groups. PIM may operate in several different modes, including Dense Mode (DM), Sparse Mode (SM) in Source-Specific Multicast (SSM) mode or Any Source Multicast (ASM) mode, and Bidirectional (BIDIR) mode.

SUMMARY

In general, techniques are described for enhancements to Protocol Independent Multicast (PIM) in an Any Source Multicast (ASM) mode in order to effectively implement Multicast only Fast Re-Route (MoFRR). According to the PIM ASM mode, a router operating as a last hop router connected to a receiver may initiate establishment of both a shared tree and a shortest path tree over which to receive multicast traffic for a given multicast group. According to the disclosed techniques, the router may use the shortest path tree as a primary path on which to receive the multicast traffic, and may use the shared tree as a secondary or backup path for MoFRR in case a failure occurs on the primary path. The techniques enable the router to perform MoFRR for PIM ASM mode without pruning the multicast traffic from the shared tree, and without building additional trees as secondary paths for MoFRR.

In one example, this disclosure is directed to a method comprising initiating, by a router in a network, establishment of a shared tree toward a rendezvous point (RP) router in the network using a PIM join message for a multicast group, and, upon receiving multicast traffic for the multicast group over the shared tree, initiating, by the router, establishment of a shortest path tree toward a source of the multicast traffic for the multicast group using a PIM join message for the source and the multicast group. The method further includes, upon receiving the multicast traffic for the multicast group over both the shared tree and the shortest path tree, programming, by a control unit of the router into a forwarding unit of the router, a multicast route for the multicast group with a primary path as the shortest path tree and a secondary path as the shared tree, without pruning the multicast traffic from the shared tree, and forwarding, by the forwarding unit of the router, multicast traffic for the multicast group received over the primary path according to the programmed multicast route.

In another example, this disclosure is directed to a routing device comprising a control unit and a forwarding unit. The control unit is configured to initiate establishment of a shared tree toward a RP router using a PIM join message for a multicast group, upon receiving multicast traffic for the multicast group over the shared tree, initiate establishment of a shortest path tree toward a source of the multicast traffic for the multicast group using a PIM join message for the source and the multicast group, and, upon receiving the multicast traffic for the multicast group over both the shared tree and the shortest path tree, programming, into the forwarding unit of the routing device, a multicast route for the multicast group with a primary path as the shortest path tree and a secondary path as the shared tree, without pruning the multicast traffic from the shared tree. The forwarding unit is configured to forward multicast traffic for the multicast group received over the primary path according to the programmed multicast route.

In a further example, this disclosure is directed to a computer-readable medium comprising instructions that when executed cause one or more programmable processors of a router to initiate establishment of a shared tree toward a RP router using a PIM join message for a multicast group, and upon receiving multicast traffic for the multicast group over the shared tree, initiate establishment of a shortest path tree toward a source of the multicast traffic for the multicast group using a PIM join message for the source and the multicast group. The instructions further cause the one or more programmable processors to, upon receiving the multicast traffic for the multicast group over both the shared tree and the shortest path tree, program, by a control unit of the router into a forwarding unit of the router, a multicast route for the multicast group with a primary path as the shortest path tree and a secondary path as the shared tree, without pruning the multicast traffic from the shared tree, and forward, by the forwarding unit of the router, the multicast traffic for the multicast group according to the programmed multicast route for the multicast group.

The details of one or more examples of the invention are set forth in the accompanying drawings and the description below. Other features, objects, and advantages of the invention will be apparent from the description and drawings, and from the claims.

DETAILED DESCRIPTION

Figure 1:
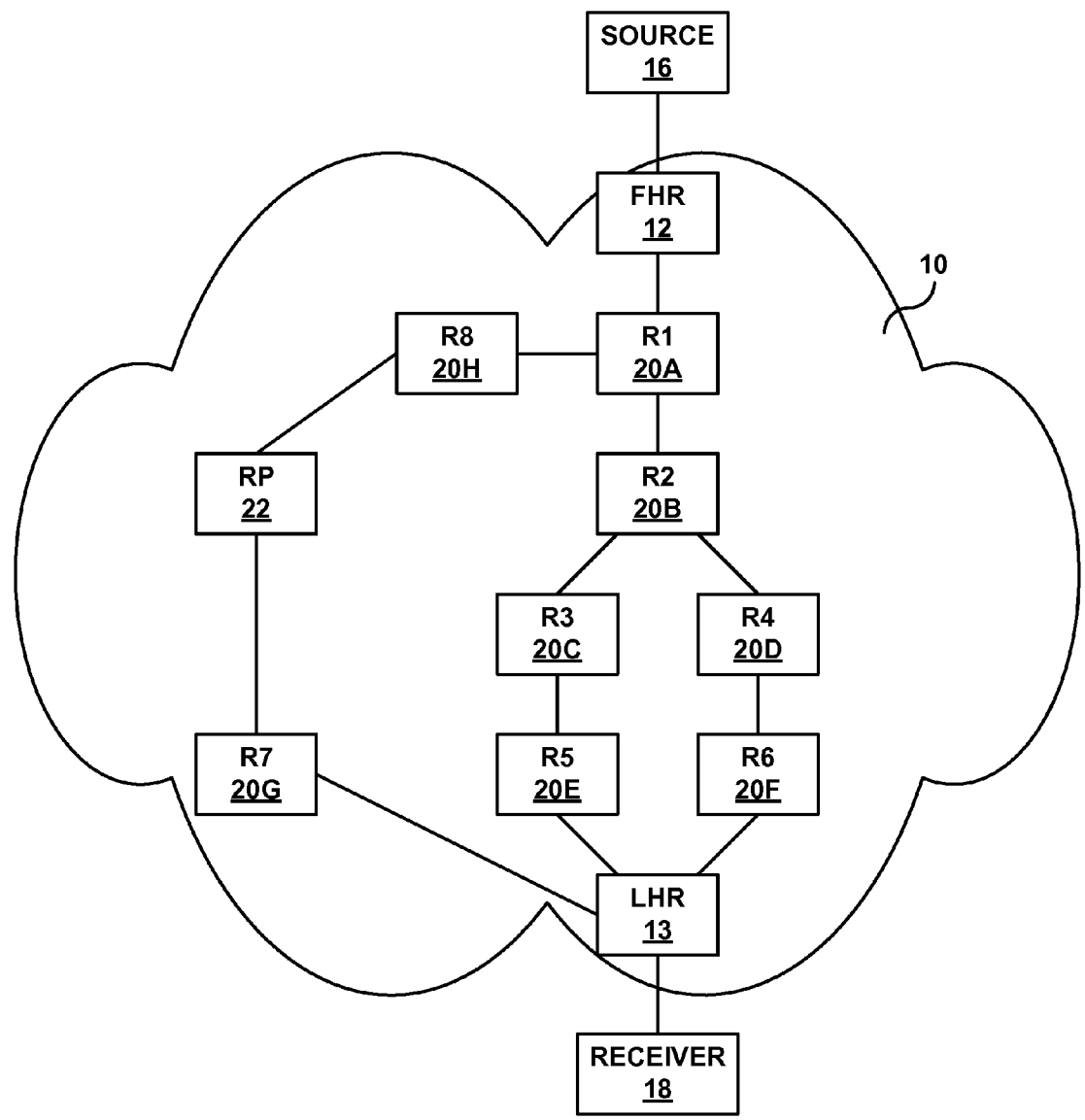
FIG. 1 is a block diagram illustrating an example computer network including routers configured to transmit multicast traffic between a source and a receiver.

FIG. 1 is a block diagram illustrating an example computer network 10 including routers configured to transmit multicast traffic between a source 16 and a receiver 18. Network 10 may comprise a private network or a public network, such as the Internet. For example, network 10 may be an enterprise network, a campus network, a service provider network, a home network, a local area network (LAN), a virtual local area network (VLAN), virtual private network (VPN), or another autonomous system. In any of these examples, remotely located source 16 and receiver 18 may share data via network 10. In an example of network 10 as an enterprise network, each of source 16 and receiver 18 may comprise one or more servers or employee computer terminals located in different regions of a single office location, or may comprise a remote office location of a corporation.

In the illustrated example, network 10 comprises an Internet Protocol (IP) network including routing devices that use a Protocol Independent Multicast (PIM) protocol to route multicast traffic through network 10 between source 16 and receiver 18 for particular multicast groups. Network 10 includes a first hop router (FHR) 12 connected to source 16, a last hop router (LHR) 13 connected to receiver 18, a plurality of transit routers 20A-20H ("routers 20"), and a router designated as a rendezvous point (RP) 22. In a typical network topology that utilizes the PIM protocol, additional transit routers may be included to the left of RP 22 such that RP 22 is generally centrally located within network 10. For purposes of illustration, these additional routers are not shown in FIG. 1.

Each of source 16 and receiver 18 may be included in a remote site (not shown) that may be a local area network (LAN) or a wide area network (WAN) comprising a plurality of subscriber devices, such as desktop computers, laptops, workstations, PDAs, wireless devices, network-ready appliances, file servers, print servers or other devices. The remote sites may be configured to support multicast traffic, such as Internet Protocol Television (IPTV), desktop conferences, corporate broadcasts, music and video web casts, and other forms of multimedia content.

Source 16 may provide traffic for one or more multicast groups. Receiver 18 may request or subscribe to traffic from one or more multicast groups. In other examples, routers within network 10 may be connected to more than one source and/or more than one receiver. Receiver 18 may subscribe to a specific multicast group to receive multicast traffic. According to the PIM protocol, RP 22 learns and stores source addresses for a certain range of multicast groups provided by source 16 and/or other sources in network 10. Other RPs in network 10, not shown in FIG. 1, may be associated with different ranges of multicast groups provided by source 16 and/or the other sources. In this way, each of FHR 12, LHR 13, and routers 20 does not need to learn and store the source addresses for every multicast group offered in network 10, but only needs to learn the addresses of RP 22 and the other RPs associated with different ranges of multicast groups. In the illustrated example of FIG. 1, RP 22 knows the address of source 16, but FHR 12, LHR 13 and routers 20 may only know the address of RP 22.

The PIM protocol may operate in several different modes, including Dense Mode (DM), Sparse Mode (SM) in Source-Specific Multicast (SSM) mode or Any Source Multicast (ASM) mode, and Bidirectional (BIDIR) mode. Additional information regarding PIM protocols may be found in Adams, A., et al., "Protocol Independent Multicast Version 2—Dense Mode Specification," RFC 3973, 2005; Fenner, B., et al., "Protocol Independent Multicast-Sparse Mode (PIM-SM): Protocol Specification (Revised)," RFC 4601, 2006; Holbrook, H. and B. Cain, "Source-Specific Multicast for IP," IETF RFC 4607, 2006; and Handley, M., et al., "Bidirectional Protocol Independent Multicast (BIDIRPIM)," IETF RFC 5015, 2007, the entire contents of each of which are incorporated by reference herein.

The techniques described in this disclosure provide enhancements to PIM in the ASM mode in order to effectively implement Multicast only Fast Re-Route (MoFRR). As described in more detail with respect to FIGS. 2A-2B below, according to the PIM ASM mode, LHR 13 connected to receiver 18 may initiate establishment of both a shared tree toward RP 22 and a shortest path tree toward source 16 over which to receive multicast traffic for a given multicast group. According to the disclosed techniques, described in more detail with respect to FIGS. 4-6 below, LHR 13 may use the shortest path tree as a primary path on which to receive the multicast traffic, and may use the shared tree as a secondary or backup path for MoFRR in case a failure occurs on the primary path. The techniques enable LHR 13 to perform MoFRR for PIM ASM mode without pruning the multicast traffic from the shared tree, and without building additional trees as secondary paths for MoFRR. In this way, PIM states and messages may be considerably reduced at LHR 13 and other relevant PIM routers, e.g., routers 20, within network 10 while providing MoFRR with dual-active paths of the given multicast group.

Figure 2A:
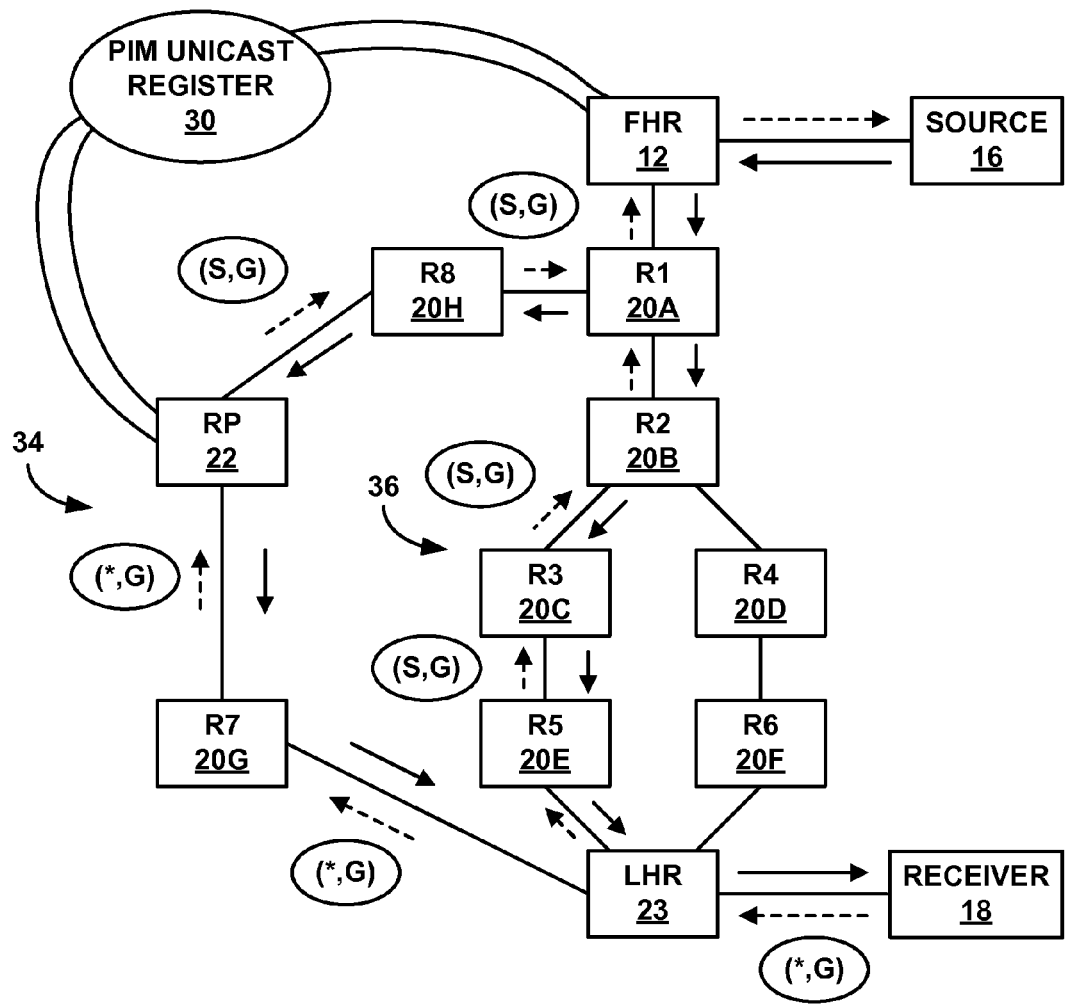
FIGS. 2A-2B are block diagrams illustrating a shared tree and a shortest path tree established by a last hop router according to Protocol Independent Multicast (PIM) Any Source Multicast (ASM) mode to transmit multicast traffic between the source and the receiver.
Figure 2B:
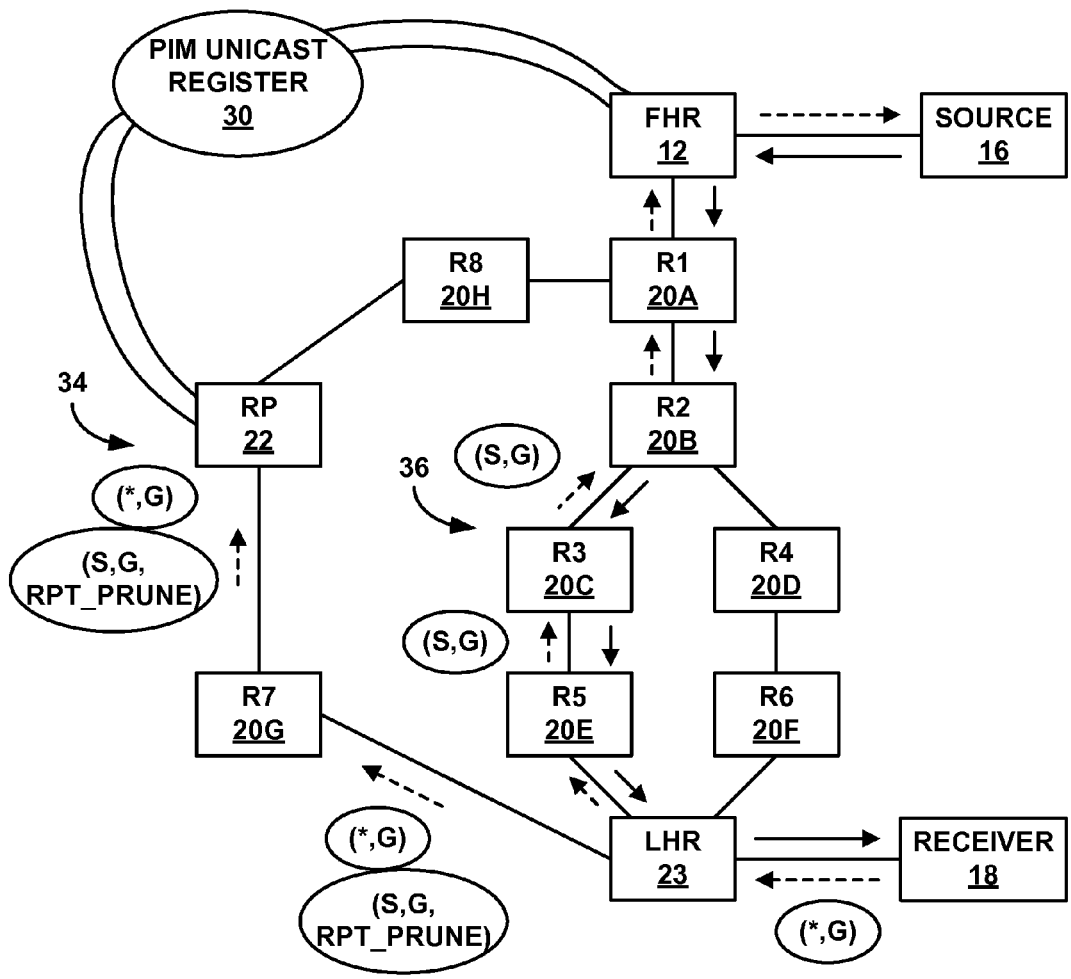

FIGS. 2A-2B are block diagrams illustrating a shared tree 34 and a shortest path tree 36 established by a last hop router (LHR) 23 according to the PIM ASM mode to transmit multicast traffic between source 16 and receiver 18. LHR 23 illustrated in FIGS. 2A-2B is configured to build multicast distribution trees according to the PIM ASM mode. In FIGS. 2A-2B, the dashed arrows indicate PIM Join messages sent towards RP 22 or source 12, and the solid arrows indicate multicast traffic being forwarded over shared tree 34 and shortest tree 36 towards receiver 18.

As illustrated in FIG. 2A, in the PIM ASM mode, LHR 23 first initiates establishment of a shared tree 34 by sending (*,G) PIM Join messages for a given multicast group requested by receiver 18 towards RP 22 via R7 20G. When source 16 starts sending multicast traffic for the given multicast group, FHR 12 sends out a unicast PIM Register packet 30 to RP 22. RP 22 then joins source 16 natively by sending (S,G) PIM Join messages for the source and the given multicast group towards source 16 via R8 20H, R1 20A and FHR 12. By virtue of the PIM Join messages, multicast traffic for the given multicast group starts flowing over the shared tree 34 to LHR 23 and then to receiver 18.

When LHR 23 receives the multicast traffic over shared tree 34, LHR 23 discovers a source address for source 16 from the multicast data packet and looks to join source 16 over the shortest path. To initiate establishment of shortest path tree 36, LHR 23 sends out (S,G) PIM Join messages for the source and the given multicast group towards source 16 via R5 20E, R3 20C, R2 20B, R1 20A and FHR 12. Upon receiving the (S,G) PIM Join messages, FHR 12 sends the multicast traffic for the given multicast group from source 16 over the shortest path tree 36 as well as the shared tree 34 to LHR 23 and then to receiver 18.

With the multicast traffic being receiver over both shared tree 34 and shortest path tree 36, LHR 23 sees traffic duplicates. LHR 23 should not forward the multicast traffic received from both shared tree 34 and shortest path tree 36 to receiver 18 as this will cause duplicates on the hosts. In real-world deployments of multicast traffic (e.g., IPTV) duplicate traffic is as much a problem as traffic loss. LHR 23 may detect the duplicate traffic by way of an incoming interface (IIF) mismatch event (i.e., IIF-MISMATCH) and decide to switch to only receive the multicast traffic for the given multicast group from shortest path tree 36. In other words, LHR 23 prunes the multicast traffic for the given multicast group from shared tree 34 and forwards the multicast traffic for the given multicast group that is received from shortest path tree 36.

As illustrated in FIG. 2B, to perform the shortest path tree (SPT) switch, LHR 23 sends (S,G,RPT_Prune) PIM Prune messages on shared tree 34 towards RP 22 via R7 20G to prune the multicast traffic for the given multicast group and the particular source 16 from shared tree 34. LHR 23 may still keep sending (*,G) PIM Join messages towards RP 22 to be able to receive multicast traffic from any other sources sending traffic for the same multicast group. In addition, LHR 23 programs a multicast route in a packet forwarding engine (PFE) of its forwarding unit to have an upstream interface for the multicast route point to shortest path tree 36 (i.e., to an incoming interface (IIF) associated with R5 20E for shortest path tree 36).

As shown in FIG. 2B, the multicast traffic for the given multicast group flows only from FHR 12 to LHR 23 over shortest path tree 36, and does not flow over shared tree 34. In other words, shortest path tree 36 is a single-active path of the multicast group. In this example, even in steady state, there are PIM states that are maintained on routers 20 between LHR 23 and RP 22, between LHR 23 and FHR 12, and between FHR 12 and RP 22. All of these PIM states have to be periodically refreshed. In general, the above description relative to FIGS. 2A-2B explains how PIM ASM mode works.

Figure 3:
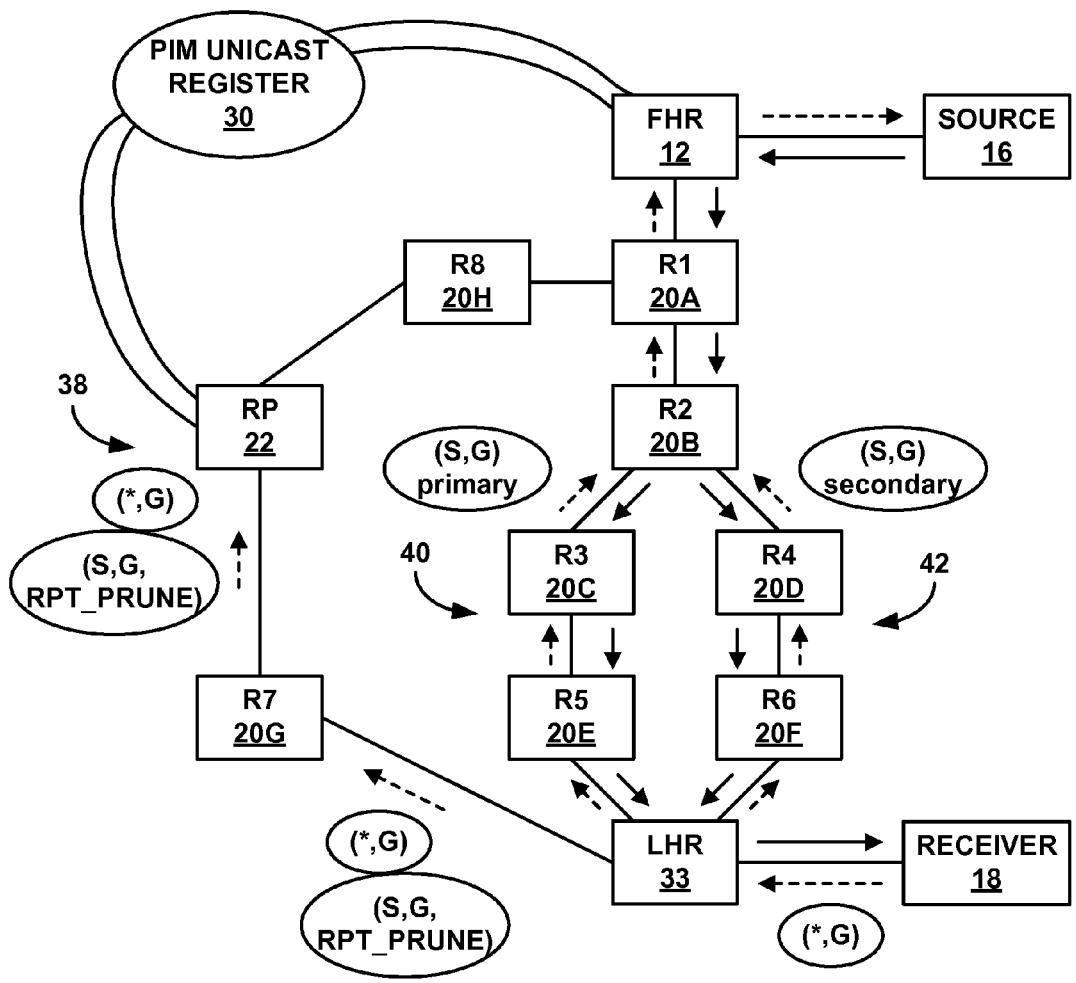
FIG. 3 is a block diagram illustrating Multicast only Fast Re-Route (MoFRR) for only shortest path trees.

FIG. 3 is a block diagram illustrating multicast only fast re-route (MoFRR) for only shortest path trees 40, 42. Karan, A., et al., "Multicast only Fast Re-Route," draft-ietf-rtgwg-mofrr-04, IETF Internet-Draft, Network Working Group, May 14, 2014 (hereinafter referred to as "draft-karan,"), the contents of which are incorporated herein by reference, describes how MoFRR works using mechanisms to build dual streams of traffic for either shortest path trees or shared trees. The MoFRR techniques of draft-karan will be described in this disclosure using two shortest path trees for illustration, but the same mechanisms could be applied to two shared trees.

LHR 33 illustrated in FIG. 3 is configured to build multicast distribution trees according to the PIM ASM mode and to perform the MoFRR techniques of draft-karan. As illustrated in FIG. 3, according to the PIM ASM mode, LHR 33 first initiates establishment of a shared tree 38 by sending (*,G) PIM Join messages for a given multicast group towards RP 22. When LHR 33 receives the multicast traffic for the given multicast group over shared tree 38, according to the MoFRR techniques of draft-karan, LHR 33 initiates establishment of two shortest path trees toward source 16 by sending (S,G) PIM Join messages for the particular source and the given multicast group over the two paths toward source 16. The two paths are referred to as primary shortest path tree (SPT) 40 and secondary SPT 42.

According to a multicast route programmed in a packet forwarding engine (PFE) of a forwarding unit of LHR 33, the multicast traffic for the given multicast group received over primary SPT 40 is forwarded by LHR 33 to receiver 18 whereas the multicast traffic for the given multicast group received over secondary SPT 42 is dropped by LHR 33. In the case of link failure detection or traffic-rate-decline detection on the primary SPT 40, the PFE in the forwarding unit of LHR 33 will update the multicast route to begin forwarding the multicast traffic received over secondary SPT path 42 instead of primary SPT 40. Since the control plane states are already built in LHR 33 for secondary SPT 42 and the multicast traffic for the given multicast group is already flowing on secondary SPT 42 in a live-live or active-active implementation, the switch over to secondary SPT 42 occurs on the order of milliseconds, thus achieving MoFRR.

The above description of the MoFRR techniques of draft-karan holds true for SPT trees only or shared trees only. In case of PIM ASM mode where a combination of shared and shortest path trees are built through the network, the MoFRR mechanisms described in draft-karan will result in too many trees and too many states in the network for the multicast flow. This is because, by virtue of the PIM ASM mode, the multicast traffic for the given multicast group from the particular source 16 is pruned off shared tree 38 such that LHR 33 and other relevant ones of routers 20 must maintain (S,G,RPT_Prune) PIM Prune states and (*,G) PIM Join states for shared tree 38. In addition, by virtue of the MoFRR techniques of draft-karan, two shortest path trees 40, 42 are built directly to source 16 such that LHR 33 and other relevant ones of routers 20 must maintain (S,G) PIM Join states for each of shortest path trees 40, 42. In this case, all of these PIM states throughout the network have to be built and maintained by periodic refreshes. In steady state, the PIM states and multicast distribution trees that have to be built and maintained are illustrated in FIG. 3.

From FIG. 3, it can be seen that there are a lot of PIM states, PIM messages and multicast distribution trees that are created by virtue of the draft-karan approach to MoFRR used with PIM ASM mode. This is resource intensive on all the routers on the network. With scaled multicast flows, these multicast distribution trees, PIM states and PIM messages may lead to severe complexity and may be hard to manage. With LAN based interfaces, where different upstream routers can forward multicast traffic for different multicast group flows, the problems of the draft-karan approach to MoFRR when used with PIM ASM mode are even more compounded. In that case, many PIM states may be built and maintained on different routers and it may be difficult to track which flows are being forwarded by a router and which ones are being dropped by the router. It may also be complex to determine the reason for dropping the multicast stream, e.g., whether it is because of (1) a pruned shared tree (S,G,RPT_Prune); (2) a MoFRR secondary path; or (3) a PIM Assert Loser, etc.

In general, draft-karan describes MoFRR using PIM or multicast Label Distribution Protocol (mLDP) and how a live-live or active-active implementation can be achieved by receiving dual streams of multicast traffic from a multicast source, forwarding the multicast traffic received from one of the streams, and discarding the multicast traffic received from the other one of the streams. The MoFRR techniques of draft-karan may be applied to only dual-active shortest path trees (S,G) or only dual-active shared trees (*,G).

As a first issue, in a network with both shared trees and shortest path trees existing in the PIM ASM mode, which is a typical deployment, extending the draft-karan MoFRR techniques for receiving dual streams of multicast traffic over two shortest path trees or over two shared trees may be highly resource intensive and may result in a lot of states and complexity not only on LHR 33 but also on transit routers 20 throughout the network. This is because LHR 33 initiates a shared tree 38 using (*,G) PIM Join messages, builds two shortest path trees 40, 42 using (S,G) PIM Join messages, and then prunes the multicast traffic from a particular source 16 off of the shared tree 38 using (S,G,RPT_Prune) PIM Prune messages. Building and maintaining several trees by maintaining and refreshing all of these PIM messages and PIM states may result in lot of complexity and scaling problems.

As a second issue, when using the draft-karan MoFRR techniques in the typical deployment topologies of the PIM ASM mode, if both shortest path trees 40, 42 merge at a node, e.g., transit router R2 20B, downstream from source 16 and progress together towards source 16, and if there is a link/node failure beyond (i.e., upstream from) the merge point, both the shortest path trees 40, 42 will fail. If both shortest path trees 40, 42 share the same fate, then the draft-karan MoFRR solution falls short of providing fast re-route for multicast traffic. As illustrated in FIG. 3, both the (S,G) SPTs 40, 42 merge at R2 20B and proceed to FHR 12. If there is a link failure between R2 20B and R1 20A, for example, both the SPTs 40, 42 will fail as they share the same fate.

Figure 4:
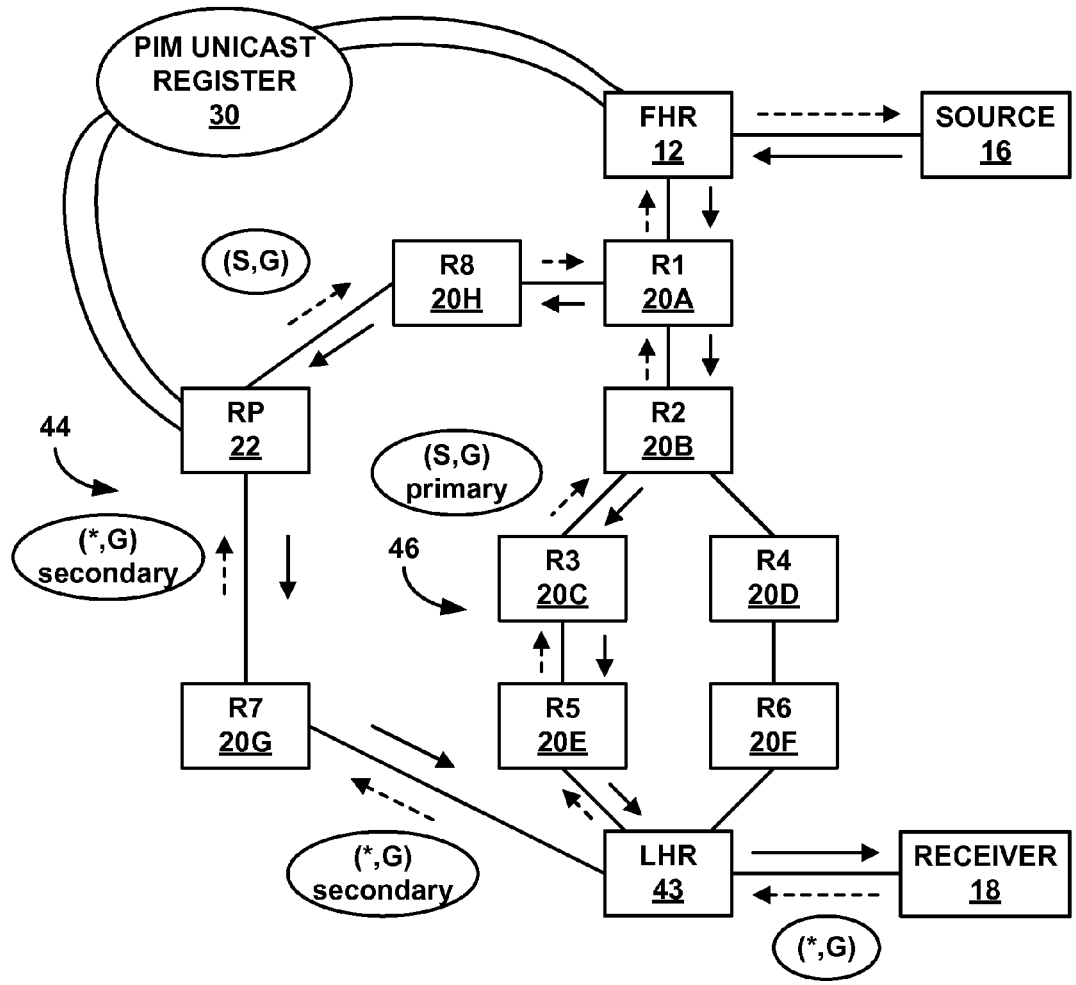
FIG. 4 is a block diagram illustrating MoFRR for a shared tree and a shortest path tree established using PIM ASM mode, in accordance with techniques of this disclosure.

FIG. 4 is a block diagram illustrating MoFRR for a shared tree 44 and a shortest path tree 46 established using the PIM ASM mode, in accordance with techniques of this disclosure. LHR 43 illustrated in FIG. 4 is configured to build multicast distribution trees according to an enhanced version of the PIM ASM mode in order to effectively perform MoFRR for PIM ASM mode according to the disclosed techniques.

Conventionally in PIM ASM mode, LHR 23 from FIGS. 2A-2B initiates establishment of shared tree 34 towards RP 22 using (*,G) PIM Join messages for a given multicast group. Upon receiving the multicast traffic for the given multicast group over the shared tree 34, LHR 23 initiates establishment of shortest path tree (SPT) 36 towards source 16 using (S,G) PIM Join messages for the particular source and the given multicast group. Upon receiving the multicast traffic for the given multicast group over both shared tree 34 and SPT 36, LHR 23 performs a SPT switch and updates a multicast route in a forwarding unit of LHR 23 to receive the multicast traffic over SPT 36 and prune the multicast traffic for the particular source and the given multicast group from shared tree 34 by sending (S,G,RPT_Prune) PIM Prune messages. LHR 33 still maintains shared tree 34 using (*,G) PIM Join messages in order to pull the multicast traffic for the given multicast group from some other source when it becomes active. In this case, there are PIM states created on shared tree 34 between LHR 23 and RP 22, i.e., (*,G) PIM Join states and (S,G,RPT_Prune) PIM Prune states, and PIM states created on shortest path tree 36 between LHR 23 and FHR 12, i.e., (S,G) PIM Join states.

As a solution to the first issue described above, the techniques of this disclosure provide enhancements to the PIM ASM mode to implement MoFRR effectively. According to the techniques of this disclosure, as illustrated in FIG. 4, LHR 43 initiates establishment of a shared tree 44 towards RP 22 using (*,G) PIM Join messages for a given multicast group. Upon receiving the multicast traffic for the multicast group over shared tree 44, LHR 43 initiates establishment of a shortest path tree (SPT) 46 towards source 16 using (S,G) PIM Join messages for the particular source and the given multicast group. Upon receiving the multicast traffic for the multicast group over both shared tree 44 and the SPT 46, LHR 43 performs a SPT switch and updates a multicast route in a forwarding unit of LHR 43 to receive the multicast traffic over both shared tree 44 and SPT 46 as dual-active paths of the multicast group.

In accordance with the disclosed techniques, LHR 43 does not prune the multicast traffic from shared tree 44 for the particular source, i.e., LHR 43 does not send (S,G, RPT_Prune) PIM Prune messages on shared tree 44 towards RP 22. Unlike the conventional PIM ASM mode, LHR 43 represses the transmission of a PIM prune message for the particular source and the given multicast group on shared tree 44. By virtue of not pruning the multicast traffic from shared tree 44, the multicast traffic for the given multicast group will flow over SPT 46 as well as shared tree 44.

A control unit of LHR 43 may define SPT 46 as equivalent to a primary path of a multicast route for MoFRR principles, and define shared tree 44 as equivalent to a secondary or backup path of the multicast route for MoFRR principles. Based on these definitions, the control unit of LHR 43 programs the multicast route for the multicast group into a forwarding unit of LHR 43. More specifically, the multicast route is programmed with a primary upstream interface as the SPT 46, i.e., an incoming interface (IIF) associated with R5 20E for SPT 46, and a secondary upstream interface as the shared tree 44, i.e., an IIF associated with R7 20G for shared tree 44, in order to forward the multicast traffic received on the primary upstream interface and drop the multicast traffic received on the secondary upstream interface. The forwarding unit of LHR 43 performs all packet forwarding engine (PFE) capabilities in switching from SPT 46 as the primary path to shared tree 44 as the secondary path upon detecting a link failure or a traffic-rate-decline on the primary path, thus achieving MoFRR convergence on the order of milliseconds.

Using the techniques described in this disclosure to perform MoFRR for PIM ASM mode, LHR 43 creates no extra trees than those trees that are typically created for conventional PIM ASM mode, e.g., shared tree 44 and shortest path tree 46. In other words, LHR 43 represses the establishment of another shortest path tree of another shared tree for use as a secondary path as in the MoFRR techniques of draft-karan. In the disclosed techniques, LHR 43 instead uses shared tree 44 as the secondary path for MoFRR in case of a failure on SPT 46 as the primary path for the multicast group. LHR 44, therefore, retains shared tree 44 in an active forwarding mode by not sending the (S,G,RPT_Prune) PIM Prune messages on shared tree 44. The shared tree 44 thereby remains a pure shared tree for the multicast group, which reduces PIM states on the routers on the shared tree 44.

As a solution to the second issue described above, the probability of both shared tree 44 and shortest path tree 46 failing is much less than the probability of a shared fate of failure for primary and secondary shortest paths, e.g., SPT paths 40, 42 from FIG. 3, in the MoFRR techniques of draft-karan. As shown in FIG. 4, shared tree 44 rooted at RP 22 and shortest path tree 46 rooted at source 16 comprise substantially separate paths that do not merge downstream from source 16. In this example, if the link between R1 20A and R2 20B goes down, LHR 43 will detect a decline in traffic rate on SPT 46 as the primary path, i.e., the IIF associated with R5 20E for SPT 46, and will be able to quickly switch to shared tree 44, i.e., the IIF associated with R7 20G for shared tree 44, as the already active secondary path using MoFRR.

As illustrated in FIG. 3, with the conventional MoFRR principles described by draft-karan, both primary and secondary paths 40, 42 will be brought down in case of a link failure between R1 20A and R2 20B. In general, there will be some equal-cost multi-path (ECMP) links between LHR 33 and FHR 12 resulting in multiple shortest path trees 40, 42 sharing the same fate. If instead a shared tree, e.g., shared tree 44, is used as the secondary path, in accordance with the techniques of this disclosure and as shown in FIG. 4, chances of a remote link failure causing disruption in both the primary and secondary paths 44, 46 is considerably reduced because they comprise substantially separate paths.

This disclosure provides several advantages. First, with the techniques of this disclosure, PIM states and PIM messages may be considerably reduced not only on LHR 43 but on other relevant PIM routers, e.g., routers 20, within the network while providing MoFRR with dual-active paths of a given multicast group. Second, there will not be any need for (S,G,RPT_Prune) PIM prune messages on a shared tree in the network, which typically increases complexity in PIM networks especially those with LAN enabled interfaces. Third, the techniques of this disclosure provide an effective approach to MoFRR for PIM ASM mode by leveraging and suitably modifying existing PIM ASM mode mechanisms to solve live-live or active-active implementation problems for MoFRR. Fourth, implementation of the techniques described in this disclosure is fairly straightforward with modifications only occurring in a control plane of the LHR.

In addition, the fate sharing of the primary and secondary paths 44, 46 of a multicast route for a given multicast group is considerably reduced by virtue of defining shared tree 44 as the secondary path. In this way, the reliability of dual-active multicast streams for MoFRR will be increased. The techniques of this disclosure also provide the double benefit of dual-active multicast streams and reduced PIM state and complexity with a few modifications to the PIM ASM mode. These benefits may be realized not only on LHR 44, but also on all relevant PIM routers, e.g., routers 20, in the network.

Table 1, below, provides a comparison of a number of PIM states between conventional PIM ASM mode alone, MoFRR technighes of draft-karan for PIM, and the disclosed techniques for MoFRR for PIM ASM mode.

TABLE 1

| PIM States | PIM ASM alone | Draft-karan MoFRR | Disclosed MoFRR |
|---|---|---|---|
| States Per flow in Shared tree | (*,G) (S,G, RPT_Prune) | (*,G) (S,G, RPT_Prune) | (*,G) |
| States Per flow in Primary shortest path tree | (S,G) | (S,G) | (S,G) |
| States Per flow in Secondary shortest path tree | — | (S,G) | — |
| States per flow in all trees | 3 | 4 | 2 |
| States for 15K flows | 45000 | 60000 | 30000 |
| States for 64K flows | 192000 | 256000 | 128000 |

As shown in Table 1, for a scale of 15000 flows in PIM ASM mode, the disclosed techniques of MoFRR for PIM ASM results in a 50% reduction in PIM states compared with the draft-karan MoFRR. In addition, an approximately 35% reduction in PIM states is achieved by the disclosed techniques compared with conventional PIM ASM, and the disclosed techniques provide live-live or active-active functionality. This reduction in PIM states also translates to a reduction in complexity and better scaling numbers. Also, an equivalent reduction is seen in the number of PIM messages and the refreshing of PIM states on all the routers with the disclosed techniques of MoFRR for PIM ASM. In this disclosure, the MoFRR logic may exist only in the way multicast forwarding routes are programmed and installed in a forwarding unit of a LHR. The PIM states themselves are not impacted with MoFRR states. The solution to the second issue described above provides a mechanism of stronger resilience over the conventional MoFRR principles described by draft-karan, in which fate sharing is a serious problem and defeats the very purpose of a live-live or active-active implementation for achieving fast re-route.

Figure 5:
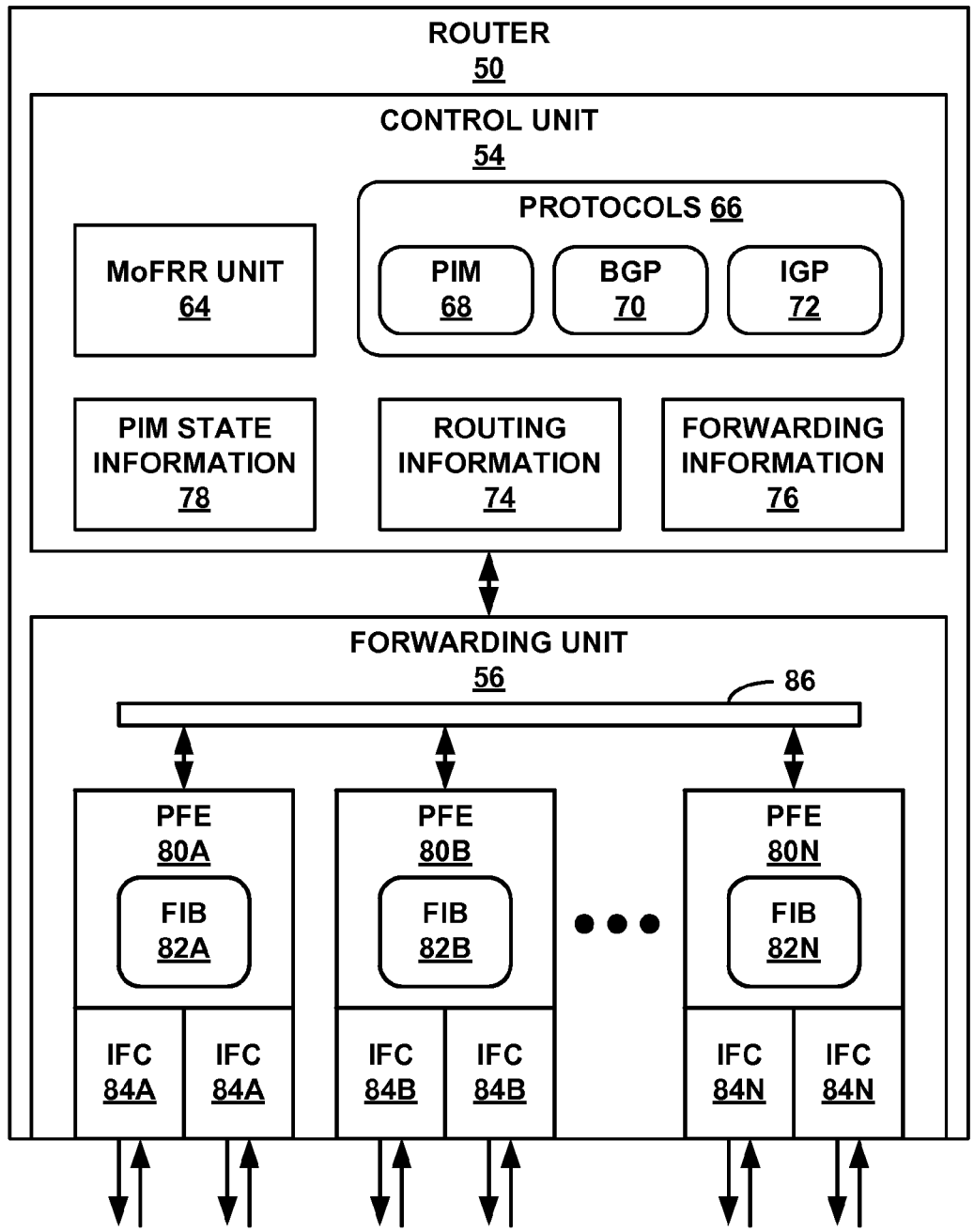
FIG. 5 is a block diagram illustrating an example router capable of performing the disclosed techniques of MoFRR for PIM ASM mode.

FIG. 5 is a block diagram illustrating an example router 50 capable of performing the disclosed techniques of MoFRR for PIM ASM mode. Router 50 may operate as a last hop router (LHR) in a network connected to a receiver. In some examples router 50 may operate substantially similar to LHR 13 from FIG. 1 and LHR 43 from FIG. 4.

In the illustrated example of FIG. 5, router 50 includes a control unit 54 that provides control plane functionality for the network device. Router 50 also includes a forwarding unit 56 with a switch fabric 86 interconnecting a set of packet-forwarding engines 80A-80N ("PFEs 80") that send and receive traffic by a set of interface cards 84A-84N ("IFCs 84") that typically have one or more physical network interface ports. PFEs 80 and switch fabric 86 collectively provide a forwarding plane for forwarding network traffic. Switch fabric 86 provides a high-speed interconnect for packet switching and forwarding incoming data packets between PFEs 80 for transmission over a network. As shown in FIG. 5, each of PFEs 80 includes one of forwarding information bases (FIBs) 82A-82N ("FIBs 82") that stores forwarding data structures installed by control unit 54. Although not shown in FIG. 5, PFEs 80 may each comprise a central processing unit (CPU), memory and one or more programmable packet-forwarding application-specific integrated circuits (ASICs).

Control unit 54 may include one or more daemons (not shown) that comprise user-level processes that run network management software, execute routing protocols to communicate with peer routers or switches, maintain and update one or more routing tables, and create one or more forwarding tables for installation to PFEs 80, among other functions. Control unit 54 provides an operating environment for various protocols 66 that perform routing functions for router 50. In the illustrated example of FIG. 5, control unit 54 includes a border gateway protocol (BGP) 70 and an interior gateway protocol (IGP) 72 as unicast routing protocols used to exchange routing information with other routing devices in a network in order to discover the network topology and update routing information 74. In the examples described in this disclosure, IGP 72 may be a link-state routing protocol such as open shortest path first (OSPF) or intermediate system-intermedia system (IS-IS). In addition, control unit 54 includes PIM 68, and specifically PIM ASM mode, as a multicast routing protocol used to build multicast distribution trees with the other routing devices in the network using routing information 74.

Routing information 74 may describe the topology of the network in which router 50 resides, and may also describe various routes within the network and the appropriate next hops for each route, i.e., the neighboring routing devices along each of the routes. Routing information 74 may include a list of incoming interfaces (IIFs) and a list of outgoing interfaces (OIFs) that indicate which of IFCs 84 are connected to the neighboring routing devices in each route. For example, a given route may comprise a multicast route for multicast traffic for a given multicast group. In that example, the list of IIFs included in routing information 74 for router 50 may include a list of upstream interfaces for all upstream routers that have PIM state for the given multicast group.

PIM state information 78 may describe a current status of links to the neighboring routing devices in the multicast distribution trees for the network established using PIM 68. For example, state information 78 may include PIM join states that describe which neighboring routing devices belong to which multicast groups within the range for a given multicast distribution tree. State information 78 may also include PIM prune states that describe which incoming interfaces for a given multicast group have been pruned from a given multicast distribution tree.

Control unit 54 analyzes stored routing information 74 and PIM state information 78 to generate forwarding information 76. Control unit 54 then installs forwarding data structures into FIBs 82 within PFEs 80 in forwarding unit 56. FIBs 80 associate network destinations with specific next hops and corresponding interface ports within the forwarding plane.

MoFRR unit 64 may control the MoFRR techniques performed by router 50. For example, MoFRR unit 64 may define a first multicast distribution tree as a primary path for a given multicast group, and may define a second multicast distribution tree as a secondary path for the given multicast group. These definitions may be used to update routing information 74 to identify one of IFCs 84 of PFEs 80 as a primary upstream interface for the primary path, and to identify another one of IFCs 84 as a secondary upstream interface for the secondary path. Control unit 54 may then program a multicast route for the given multicast group with the identified interfaces into FIBs 82 of PFEs 80. In this way, in accordance with the programmed multicast route, PFEs 80 may forward the multicast traffic received on the primary upstream interface and drop the multicast traffic received on the secondary upstream interface. In addition, PFEs 80 may perform MoFRR capabilities to switch from receiving traffic on the primary path to receiving traffic on the secondary path upon link failure detection or traffic-rate-decline detection by MoFRR unit 64.

According to the techniques of this disclosure, control unit 54 uses PIM 68 to initiate establishment of a shared tree, e.g., shared tree 44 of FIG. 4, towards an RP using (*,G) PIM Join messages for a given multicast group. Upon receiving the multicast traffic over the shared tree, control unit 54 using PIM 68 to initiate establishment of a shortest path tree (SPT), e.g., SPT 46 from FIG. 4, towards a source using (S,G) PIM Join messages for the particular source and the given multicast group. Upon receiving the multicast traffic over both the shared tree and the SPT, control unit 54 performs a SPT switch and programs a multicast route into FIBs 82 in PFEs 80 to forward the multicast traffic received over the SPT and discard the multicast traffic received over the shared tree. Unlike the conventional PIM ASM mode, control unit 54 does not prune the multicast traffic for the given multicast group from the shared tree for the particular source, i.e., control unit 54 does not send (S,G,RPT_Prune) PIM Prune messages towards the RP on the shared tree. In this way, the multicast traffic will flow over both the SPT and the shared tree in a live-live or active-active implementation. The described techniques provide a modified version of the PIM ASM mode such that MoFRR unit 64 of control unit 54 may operate to suppress the transmission of the PIM Prune state for the shared tree.

According the techniques of this disclosure, MoFRR unit 64 defines the SPT as a primary path of a multicast route, and defines the shared tree as a secondary path of the multicast route for purposes of MoFRR. MoFRR unit 64 then updates the multicast route for the given multicast group in FIBs 82 of PFEs 80 with a primary upstream interface as an IIF for the SPT and a secondary upstream interface as an IIF for the shared tree. According to the programmed multicast route for the given multicast group, FIBs 82 in PFEs 80 forward the multicast traffic for the multicast group received on the primary upstream interface and drop the multicast traffic for the multicast group received on the secondary upstream interface. PFEs 80 are configured to switch from the SPT as the primary path of the multicast route to the shared tree as the secondary path of the multicast route upon link failure detection or traffic-rate-decline detection by MoFRR 64.

The disclosed techniques for MoFRR for the PIM ASM mode result in router 50 establishing no extra trees than those trees that are typically created for the conventional PIM-ASM mode, e.g., shared tree 44 and SPT 46. Unlike the MoFRR techniques of draft-karan, MoFRR unit 64 represses establishment of another shortest path tree toward the source to act as the secondary path for MoFRR, and also represses definition of another already built shortest path tree toward the source as the secondary path for MoFRR. In this way, no additional PIM Join states are created or maintained by PIM state information 78. In addition, MoFRR unit 64 retains the shared tree in an active forwarding mode by not sending the (S,G,RPT_Prune) PIM Prune message on the shared tree. In this way, no PIM prune states are created or maintained by PIM state information 78.

The architecture of router 50 illustrated in FIG. 5 is shown for exemplary purposes only and should not be limited to this architecture. In other examples, router 50 may be configured in a variety of ways. In one example, some of the functionally of control unit 54 may be distributed within PFEs 80. Control unit 54 may be implemented solely in software, or hardware, or may be implemented as a combination of software, hardware, or firmware. For example, control unit 54 may include one or more processors which execute software instructions. In that case, the various software modules of control unit 54 may comprise executable instructions stored on a computer-readable medium, such as computer memory or hard disk.

Figure 6:
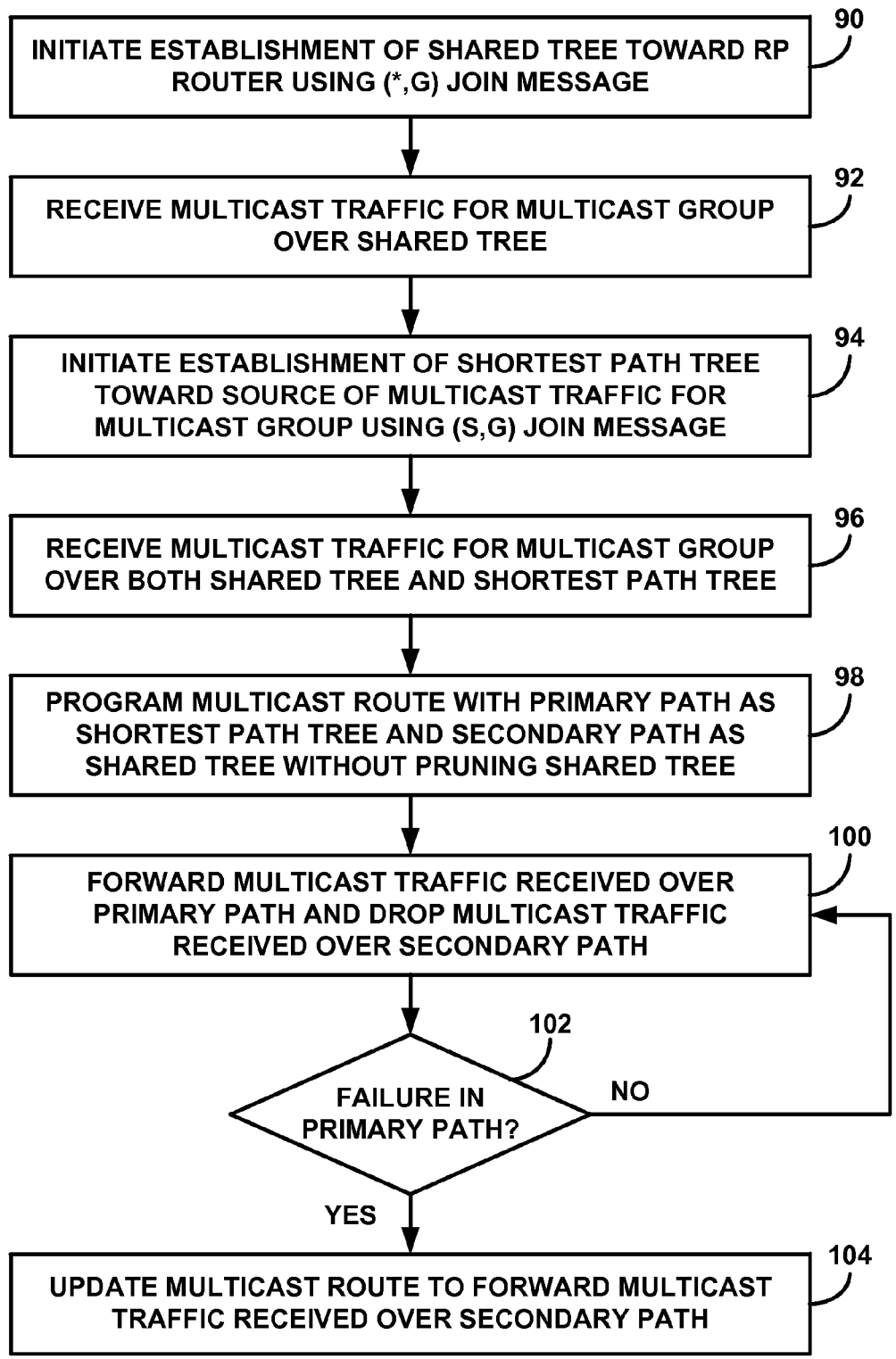
FIG. 6 is a flowchart illustrating an example operation of performing MoFRR for PIM ASM mode.

FIG. 6 is a flowchart illustrating an example operation of a router performing MoFRR for PIM ASM mode. The example operation of FIG. 6 is described with respect to router 50 from FIG. 5 when operating as a last hop router connected to a receiver. In other examples, the operation of FIG. 6 may also be performed by LHR 13 from FIG. 1 or LHR 43 from FIG. 4.

When a receiver, such as receiver 18 from FIGS. 1-4, is interested in receiving multicast traffic for a given multicast group, the receiver will request such multicast traffic from router 50 operating as a last hop router in a network, e.g., network 10, connected to the receiver. Upon receiving the request from the receiver, a control unit 54 of router 50 initiates establishment of a shared tree, e.g., shared tree 44 from FIG. 4, toward a RP router, e.g., RP router 22, in the network using a (*,G) PIM join message for the given multicast group (90). As this point, router 50 does not know the source address of the desired multicast traffic. Once the shared tree is established to the RP router, the RP router may request to join a source, e.g., source 16 from FIGS. 1-4, of the multicast traffic for the given multicast group by sending a (S,G) PIM join message toward the source. Router 50 will then receive the multicast traffic for the given multicast group over the shared tree (92).

Router 50 learns the source address of the desired multicast traffic from the multicast data packets received over the shared tree. In accordance with PIM ASM mode, control unit 54 of router 50 initiates establishment of a shortest path tree, e.g., shortest path tree 46 from FIG. 4, toward the source, e.g., source 16, of the multicast traffic for the multicast group using a (S,G) PIM join message for the source and the given multicast group (94). Router 50 will then receive the multicast traffic for the given multicast group over both the shared tree and the shortest path tree (96).

According to the techniques described in this disclosure for performing MoFRR for PIM ASM mode, responsive to receive the multicast traffic for the given multicast group over both the shared tree and the shortest path tree, MoFRR unit 64 in control unit 54 of router 50 defines the shortest path tree as a primary path and defines the shared tree as a secondary or backup path of a multicast route for the given multicast group. Based on these definitions, control unit 54 programs into FIBs 82 of one or more of PFEs 80 in forwarding unit 56 of router 50 the multicast route for the multicast group with the primary path as the shortest path tree and the secondary path as the shared tree, without pruning the multicast traffic from the shared tree (98). More specifically, to program the multicast route into FIBs 82, control unit 54 selects a primary upstream interface for the multicast route as a first incoming interface (IIF) of one of IFCs 84 of PFEs 80 for the shortest path tree, and selects a secondary upstream interface for the multicast route as a second IIF of another one of IFCs 84 of PFEs 80 for the shared tree.

Unlike the conventional MoFRR techniques described above, MoFRR unit 64 defines the already built shared tree as the secondary path for MoFRR in case of a failure in the primary path. According to the disclosed techniques, responsive to receiving the multicast traffic for the given multicast group over both the shared tree and the shortest path tree, MoFRR unit 64 represses transmission of a (S,G,RPT_Prune) PIM prune message for the source and the given multicast group on the shared tree. In this way, both the shortest path tree as the primary path and the shared tree as the secondary path remain active paths of the multicast group in the network. In addition, responsive to receiving the multicast traffic for the given multicast group over the shared tree and initiating establishment of the shortest path tree, MoFRR unit 64 represses establishment of another shortest path tree toward the source to act as the secondary path for MoFRR. In addition, responsive to receiving the multicast traffic for the given multicast group over both the shared tree and the shortest path tree, MoFRR unit 64 also represses definition of another already built shortest path tree toward the source as the secondary path for MoFRR so as to program the multicast route for the multicast group.

In accordance with the programmed multicast route for the given multicast group, PFEs 80 of forwarding unit 56 forward the multicast traffic for the given multicast group received over the shortest path tree as the primary path, and drop the multicast traffic for the given multicast group received over the shared tree as the secondary path (100). In this way, PFEs 80 will only forward one set of the multicast traffic for the given multicast group to the receiver. In one example, upon receiving the multicast traffic for the given multicast group on an IIF of one of IFCs 84 of PFEs 80, the one of PFEs 80 compares the IIF on which the multicast traffic was received with the selected primary upstream interface for the multicast route. Based on the IIF being the primary upstream interface for the multicast route, the one of PFEs 80 forwards the multicast traffic to the receiver, and based on the IIF being the secondary upstream interface and not the primary upstream interface, the one of PFEs 80 drops the multicast traffic.

Upon detecting a failure in the primary path (YES branch of 102), PFEs 80 of forwarding unit 56 update the multicast route for the given multicast group in their FIBs 82 to forward the multicast traffic received over the shared tree as the secondary path (104). In this way, PFEs 80 will perform MoFRR by switching from the failed primary path to the already live secondary path, and forward the multicast traffic for the given multicast group to the receiver according to the updated multicast route. If a failure is not detected in the primary path (NO branch of 102), PFEs 80 of forwarding unit 56 will continue to forward the multicast traffic received over the shortest path tree as the primary path, and drop the multicast traffic received over the shared tree as the secondary path in according with the programmed multicast route (100).

Various examples of the invention have been described. These and other examples are within the scope of the following claims.

What is claimed is:

1. A method comprising:
   initiating, by a router in a network, establishment of a shared tree toward a rendezvous point (RP) router in the network using a first protocol independent multicast (PIM) join message that identifies a multicast group;
   upon receiving multicast traffic for the multicast group over the shared tree, initiating, by the router, establishment of a shortest path tree toward a source of the multicast traffic for the multicast group using a second PIM join message that identifies the source and the multicast group;
   upon receiving the multicast traffic for the multicast group over both the shared tree and the shortest path tree, defining the shortest path tree as a primary path and defining the shared tree as a secondary path for multicast only fast re-route (MoFRR);
   programming, by a control unit of the router and into a forwarding unit of the router, a multicast route toward a receiver of the multicast traffic for the multicast group, the multicast route including the primary path and the secondary path; and
   forwarding, by the forwarding unit of the router, the multicast traffic for the multicast group according to the programmed multicast route including forwarding the multicast traffic received over the primary path toward the receiver, and dropping the multicast traffic received over the secondary path.

2. The method of claim 1, wherein the shortest path tree and the shared tree are both active paths of the multicast group in the network.

3. The method of claim 1, wherein the shared tree and the shortest path tree comprise separate paths in the network that do not merge downstream from the source.

4. The method of claim 1, further comprising, upon detecting a failure in the primary path, performing MoFRR to switch from the primary path to the secondary path, wherein performing MoFRR comprises:

updating, by the forwarding unit of the router, the multicast route for the multicast group; and forwarding, by the forwarding unit of the router and according to the updated multicast route, the multicast traffic received over the secondary path toward the receiver.

5. The method of claim 1, further comprising:

responsive to receiving the multicast traffic for the multicast group over the shared tree and initiating establishment of the shortest path tree toward the source, repressing, by the control unit of the router, establishment of another shortest path tree toward the source for MoFRR; and responsive to receiving the multicast traffic for the multicast group over both the shared tree and the shortest path tree, repressing, by the control unit of the router, definition of another shortest path tree as the secondary path of the multicast route for MoFRR.

6. The method of claim 1, further comprising, responsive to receiving the multicast traffic for the multicast group over both the shared tree and the shortest path tree, repressing, by the control unit of the router, transmission of a PIM prune message that identifies the source and the multicast group on the shared tree, wherein transmission of the PIM prune message on the shared tree causes the multicast traffic for the multicast group to stop flowing over the shared tree.

7. The method of claim 1, wherein programming the multicast route comprises:

selecting, by the control unit of the router, a first incoming interface (IIF) of the router for the shortest path tree to be a primary upstream interface for the multicast route; and selecting, by the control unit of the router, a second IIF of the router for the shared tree to be a secondary upstream interface for the multicast route.

8. The method of claim 7, wherein forwarding the multicast traffic according to the programmed multicast route comprises:

receiving, on a third IIF of the router, the multicast traffic for the multicast group;

comparing, by the forwarding unit of the router, the third IIF of the router on which the multicast traffic was received with the primary upstream interface for the multicast route;

based on the third IIF being the primary upstream interface, forwarding the multicast traffic received on the third IIF to the receiver; and based on the third IIF not being the primary upstream interface, dropping the multicast traffic received on the third IIF.

9. A routing device comprising:

a control unit configured to:

initiate establishment of a shared tree toward a rendezvous point (RP) router using a first protocol independent multicast (PIM) join message that identifies a multicast group, upon receiving multicast traffic for the multicast group over the shared tree, initiate establishment of a shortest path tree toward a source of the multicast traffic for the multicast group using a second PIM join message that identifies the source and the multicast group, and upon receiving the multicast traffic for the multicast group over both the shared tree and the shortest path tree, define the shortest path tree as a primary path and define the shared tree as a secondary path for multicast only fast re-route (MoFRR), and program, into a forwarding unit of the routing device, a multicast route toward a receiver of the multicast traffic for the multicast group, the multicast route including the primary path and the secondary path; and a forwarding unit configured to forward the multicast traffic for the multicast group according to the programmed multicast route, wherein the forwarding unit is configured to forward the multicast traffic received over the primary path toward the receiver, and drop the multicast traffic received over the secondary path.

10. The routing device of claim 9, wherein the shortest path tree and the shared tree are both active paths of the multicast group.

11. The routing device of claim 9, wherein the shared tree and the shortest path tree comprise separate paths in the network that do not merge downstream from the source.

12. The routing device of claim 9, wherein the forwarding unit is configured to, upon detecting a failure in the primary path, perform MoFRR to switch from the primary path to the secondary path, wherein, to perform MoFRR, the forwarding unit is further configured to:

update the multicast route for the multicast group; and forward the multicast traffic received over the secondary path to the receiver according to the updated multicast route.

13. The routing device of claim 9, wherein the control unit is configured to:

responsive to receiving the multicast traffic for the multicast group over the shared tree and initiating establishment of the shortest path tree toward the source, repress establishment of another shortest path tree toward the source for MoFRR; and responsive to receiving the multicast traffic for the multicast group over both the shared tree and the shortest path tree, repress definition of another shortest path tree as the secondary path of the multicast route for MoFRR.

14. The routing device of claim 9, wherein the control unit is configured to, responsive to receiving the multicast traffic for the multicast group over both the shared tree and the shortest path tree, repress transmission of a PIM prune message that identifies the source and the multicast group on the shared tree, wherein transmission of the PIM prune message on the shared tree causes the multicast traffic for the multicast group to stop flowing over the shared tree.

15. The routing device of claim 9, wherein, to program the multicast route, the control unit is configured to:

select a first incoming interface (IIF) of the routing device associated with the shortest path tree to be a primary upstream interface for the multicast route; and select a second IIF of the routing device associated with the shared tree to be a secondary upstream interface for the multicast route.

16. The routing device of claim 15, wherein the forwarding unit is configured to, according to the programmed multicast route:

receive the multicast traffic for the multicast group on a third IIF of the routing device;

compare the third IIF of the routing device on which the multicast traffic was received with the primary upstream interface for the multicast route;

based on the third IIF being the primary upstream interface, forward the multicast traffic received on the third IIF toward the receiver; and based on the third IIF not being the primary upstream interface, drop the multicast traffic received on the third IIF.

17. A non-transitory computer-readable medium comprising instructions that when executed cause one or more programmable processors of a router to:
   initiate establishment of a shared tree toward a rendezvous point (RP) router using a first protocol independent multicast (PIM) join message that identifies a multicast group;
   upon receiving multicast traffic for the multicast group over the shared tree, initiate establishment of a shortest path tree toward a source of the multicast traffic for the multicast group using a second PIM join message that identifies the source and the multicast group;
   upon receiving the multicast traffic for the multicast group over both the shared tree and the shortest path tree, define the shortest path tree as a primary path and define the shared tree as a secondary path for multicast only fast re-route (MoFRR);
   program, by a control unit of the router and into a forwarding unit of the router, a multicast route toward a receiver of the multicast traffic for the multicast group, the multicast route including the primary path and the secondary path; and
   forward, by the forwarding unit of the router, the multicast traffic for the multicast group according to the programmed multicast route for the multicast group, wherein the instructions further cause the one or more programmable processors to forward the multicast traffic received over the primary path toward the receiver, and drop the multicast traffic received over the secondary path.

* * * * *